INVENTORS
John W. Edgemond, Jr.
William C. Grosjean
BY
Fleha and Swain
ATTORNEYS Sept. 8, 1959 J. W. EDGEMOND, JR., ET AL 2,903,027

BLADE TRACKING AND GUIDING MECHANISM FOR BAND SAW CONSTRUCTION

Filed Feb. 13, 1956 8 Sheets-Sheet 2

INVENTORS
John W. Edgemond, Jr.
William C. Grosjean
BY
[signature]
ATTORNEYS

INVENTORS
John W. Edgemond, Jr.
William C. Grosjean
BY
Fleher & Swain
ATTORNEYS

INVENTORS
John W. Edgemond, Jr.
William C. Grosjean
BY Flehr and Swain
ATTORNEYS Sept. 8, 1959 J. W. EDGEMOND, JR., ET AL 2,903,027

BLADE TRACKING AND GUIDING MECHANISM FOR BAND SAW CONSTRUCTION

Filed Feb. 13, 1956 8 Sheets-Sheet 5

INVENTORS
John W. Edgemond, Jr.
William C. Grosjean

BY Fleher and Swain

ATTORNEYS

INVENTORS
John W. Edgemond, Jr.
BY William C. Grosjean

Fehr and Swain
ATTORNEYS

INVENTORS
John W. Edgemond, Jr.
William C. Grosjean
BY
Flehr and Swain
ATTORNEYS Sept. 8, 1959 J. W. EDGEMOND, JR., ET AL 2,903,027

BLADE TRACKING AND GUIDING MECHANISM FOR BAND SAW CONSTRUCTION

Filed Feb. 13, 1956 8 Sheets-Sheet 8

INVENTORS
John W. Edgemond, Jr.
BY William C. Grosjean
Flehr and Swain
ATTORNEYS United States Patent Office 2,903,027

Patented Sept. 8, 1959

2,903,027

BLADE TRACKING AND GUIDING MECHANISM FOR BAND SAW CONSTRUCTION

John W. Edgemond, Jr., Los Altos, and William C. Grosjean, Mountain View, Calif., assignors, by mesne assignments, to Yuba Consolidated Industries, Inc., San Francisco, Calif., a corporation of Delaware Application February 13, 1956, Serial No. 565,054

3 Claims. (Cl. 143—27)

This invention relates to band saws.

Band saws are well known and consist of an endless blade which passes over two or more pulleys which drive it past a working station. When the saw blade in a conventional band saw is tracking properly over the driving and idler pulleys, it does not engage the back-up rollers, but when a work piece is brought into engagement with the blade, the blade is urged into engagement with the back-up rollers. Thus, when the load against the blade is the heaviest, it is normally urged out of its ideal and most efficient path. Moreover, when the work is drawn away, the blade also tends to be drawn away from its most effective path, and, since there are no back-up rollers on the toothed side of the blade, it may not only be urged from the ideal operating path but may be removed from the guides because the forces tending to retain the blade in its path are at their minimum when the blade is properly adjusted to operate in its proper path at the crowns of the pulleys. The forces tending to retain or restore the blade to its path increase as the blade is urged from the crowns to one side or the other of the pulley or pulleys.

We have found that conventional band saws require and provide four adjustments and it is an object of our invention to provide a band saw construction in which the number of adjustments is reduced.

Conventional band saws require an adjustment or relocation of the back-up rollers when blades of different widths are used. For example, when the blade of a conventional band saw is properly adjusted it will ride the crowns of the pulleys, and the back-up rollers must be adjustable so they may be positioned immediately adjacent the blade to retain the blade in the path thus defined when a work piece is urged against it.

It is an object of this invention to provide a band saw construction in which the back-up rollers need not be adjusted as blades of different widths are used and in which a factory setting or other permanent setting may be retained regardless of blade width.

It is a further object of this invention to provide a band saw construction in which the back-up rollers define the path in which the blade operates and in which the blade is urged into and caused to operate in that path.

It is a further object of this invention to provide a band saw construction in which the back-up rollers define the path in which the blade is to operate and in which the blade is urged into that path by the construction and mounting of the pulleys.

Conventional saws require adjustment of the guide shoes which limit the side to side movement of the blade as the work piece is moved from side to side. Such shoes are adjustable horizontally so that they clear the teeth of the blade. We provide the same adjustment. The upper guide shoes must be adjusted vertically so that they clear the work piece. This adjustment is also present on our device but in the conventional band saw, the operator must use both hands to complete this adjustment.

It is an object of our invention to provide a band saw construction in which the upper guide shoes are so mounted for vertical movement that they may be raised or lowered, and retained in the selected position by a single control.

Conventional band saws require a means for adjusting at least one of the pulleys to provide proper blade tension. This is normally accomplished by mounting the pulley in a block or blocks which are movable in guides whereby the pulley centers may be spaced further apart or nearer together.

It is an object of this invention to provide a band saw construction in which one of the pulleys is mounted upon a crank arm assembly which is pivotally mounted upon the frame to provide a simpler and more rugged frame construction.

Conventional band saws require means for tilting the axis of one of the pulleys to cause the blade to track on the crowns of the pulleys. While the blade might normally tend to seek the crowns, the axis of rotation of at least one pulley must be tiltable to ensure that the blade tracks on the crowns and in a path defined by the crowns of the pulleys.

When an operator changes the blade in a conventional band saw, he "backs off" on all adjustments. Then he first mounts the blade on the pulleys. He next adjusts the pulleys for proper tension for the blade. He may then turn the blade by hand and observe the path which the blade follows. By adjusting the tilt mechanism which varies the tilt of the upper pulley, he causes the blade to seek the crowns of the pulleys and its proper path. He next adjusts the back-up rollers and finally the guides are adjusted. Thus it is apparent that such a construction requires that all four adjustments be made or at least reexamined and reconsidered when a new blade is mounted upon the saw.

It is an object of this invention to provide a band saw construction in which the correct tilt of the axis of rotation or of the plane of rotation of the pulley is automatically obtained.

It is a further object of this invention to provide a device in which the pulley may be tilted without requiring readjustment or relocation of the back-up rollers.

It is a further object of this invention to provide a band saw construction in which only two of the normal adjustments, blade tensioning and guide shoe adjustment, are required with a change of blade and in which the back-up rollers need not be relocated and in which the pulley is automatically tilted when a blade is changed.

In conventional band saws an insert is provided in the table which supports the work piece and through which the blade passes. The insert is ordinarily circular in shape and is provided with an elongated slot to accommodate the blade. It rests in a circular hole in the table and when the saw assembly and table vibrate, the insert may rotate in the hole and the blade may engage the sides of the slot.

It is an object of this invention to provide a table insert which will not turn and in which the blade will not engage the sides of the slot.

It is also an object of our invention to provide a table construction which is provided with a pair of slots set at right angles to each other and which will accommodate a mitre gauge of the type illustrated in Edgemond, et al. application Serial No. 494,468, filed March 15, 1955, for a Combination Power Tool whereby the mitre gauge may be used as a mitre gauge when positioned in one slot and as a fence when positioned and locked in the other slot.

Other objects and advantages of our invention will appear from the following specification taken in conjunction with the accompanying drawings in which.

Figures 1, 12:
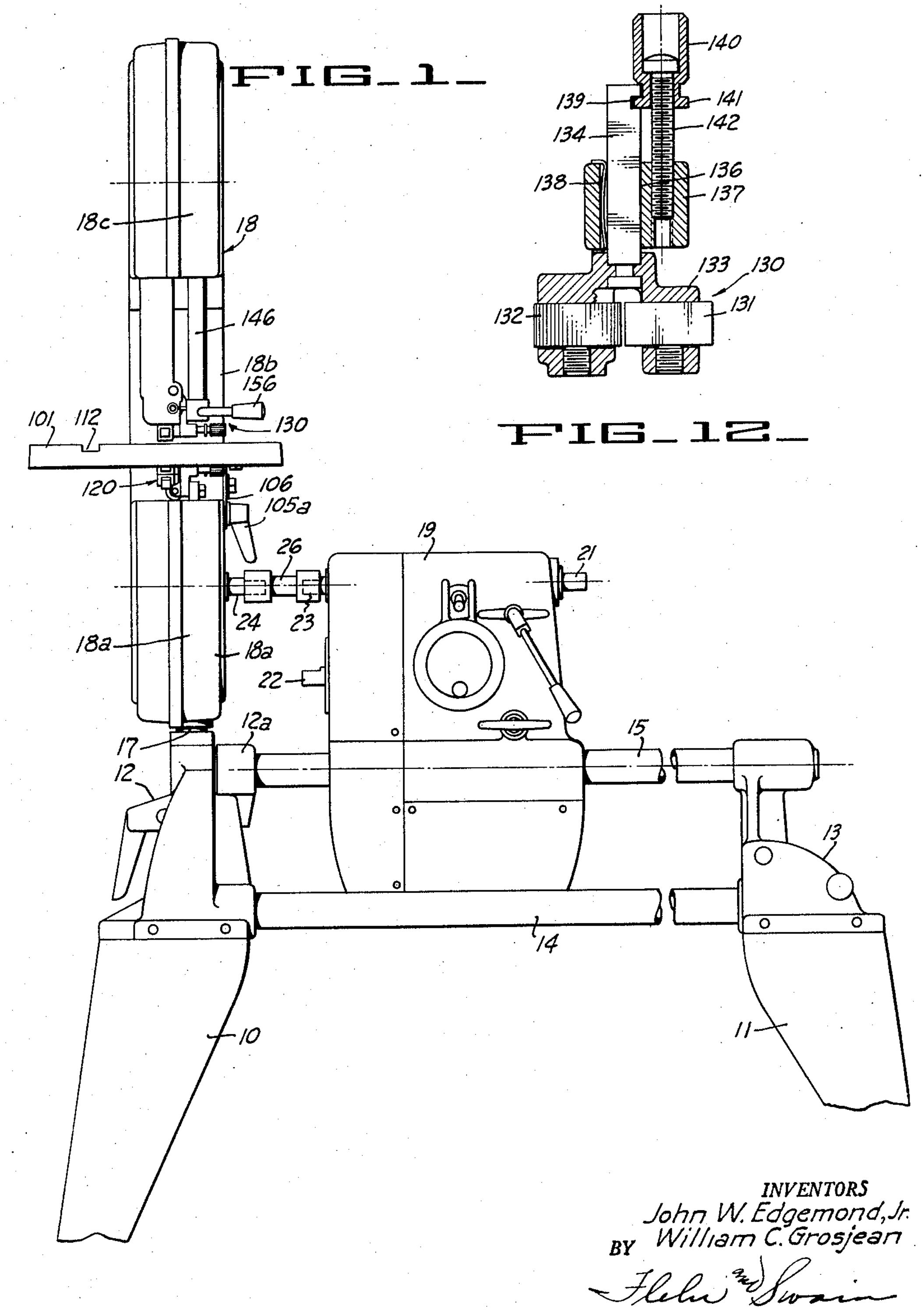
Figure 1 is a front elevational view of a band saw incorporating our invention and showing the same mounted on one end of a "Combination Power Tool" of the type disclosed in Edgemond et al. application Serial No. 494,468, filed March 15, 1955.
Figure 12 (sheet 1) is a view taken along the line 12—12 of Figure 9 showing the method of mounting the horizontally adjustable guide shoes (in this figure the guide assemblies are in fully retracted position)

As indicated in the drawings, our device is adapted to be mounted upon one end of the Combination Power Tool disclosed in Edgemond et al. application, Serial No. 494,468, filed March 15, 1955. While this tool illustrates a preferred embodiment and mounting, it must be understood that our device may be mounted for separate operation on a stand of its own and may be driven by an independent motor.

As is pointed out in the above identified Edgemond et al. application, the combination power tool includes a pair of opposed identical tool bench ends 10 and 11 which support castings 12 and 13. The castings 12 and 13 accommodate parallel longitudinally extending tubes 14 and 15. Tubes 15 are supported at one end by casting 13 and at their other ends by casting 12*a* which may be clamped to casting 12 thereby providing a sturdy, rigid bench or supporting member.

The end casting 12 is provided with a pair of parallel spaced vertical sockets which are adapted to receive a pair of spaced parallel mounting tubes 16 and 17 whose other ends are received in similar recesses in a member 18 which forms a mounting base for our band saw.

The parallel tubular ways 15 provide a mounting for a headstock member indicated generally at 19 which supports an electric motor which is operatively connected to the power take-off shafts 21, 22 and 23, each of whose functions has been previously described in the aforementioned Edgemond et al. application. We provide a drive shaft 24 which is adapted to be coaxially aligned with the power take-off shaft 23 and to be operatively connected thereto by means of a readily removable coupling 26. It is apparent that our device can be mounted in any suitable base which is provided with spaced parallel cylindrically shaped sockets which are adapted to accommodate the mounting tubes 16 and 17 and which is further provided with a motor and means for operatively connecting the same to the driven shaft 24.

Generally speaking, our band saw is supported on the base member 18 which, as shown in the drawings, consists of a C-shaped casting which forms the framework for our entire structure. The lower arm 18*a* of the C-shaped casting 18 provides a mounting for the shaft 24 and the pulley which drives the saw blade. This portion of the base also provides a mounting for the table which supports the work piece. The narrow portion 18*b* of the member 18 serves to support the upper portion 18*c* and provides a throat area immediately above the table within which the work piece may be positioned, and the upper portion 18*c* provides a support for the idler pulley over which the saw band is driven, all as will more fully hereinafter be described.

The member 18 is preferably in the form of a die casting and appropriate strengthening ribs, bosses, etc. are molded integrally therewith.

Figure 2:
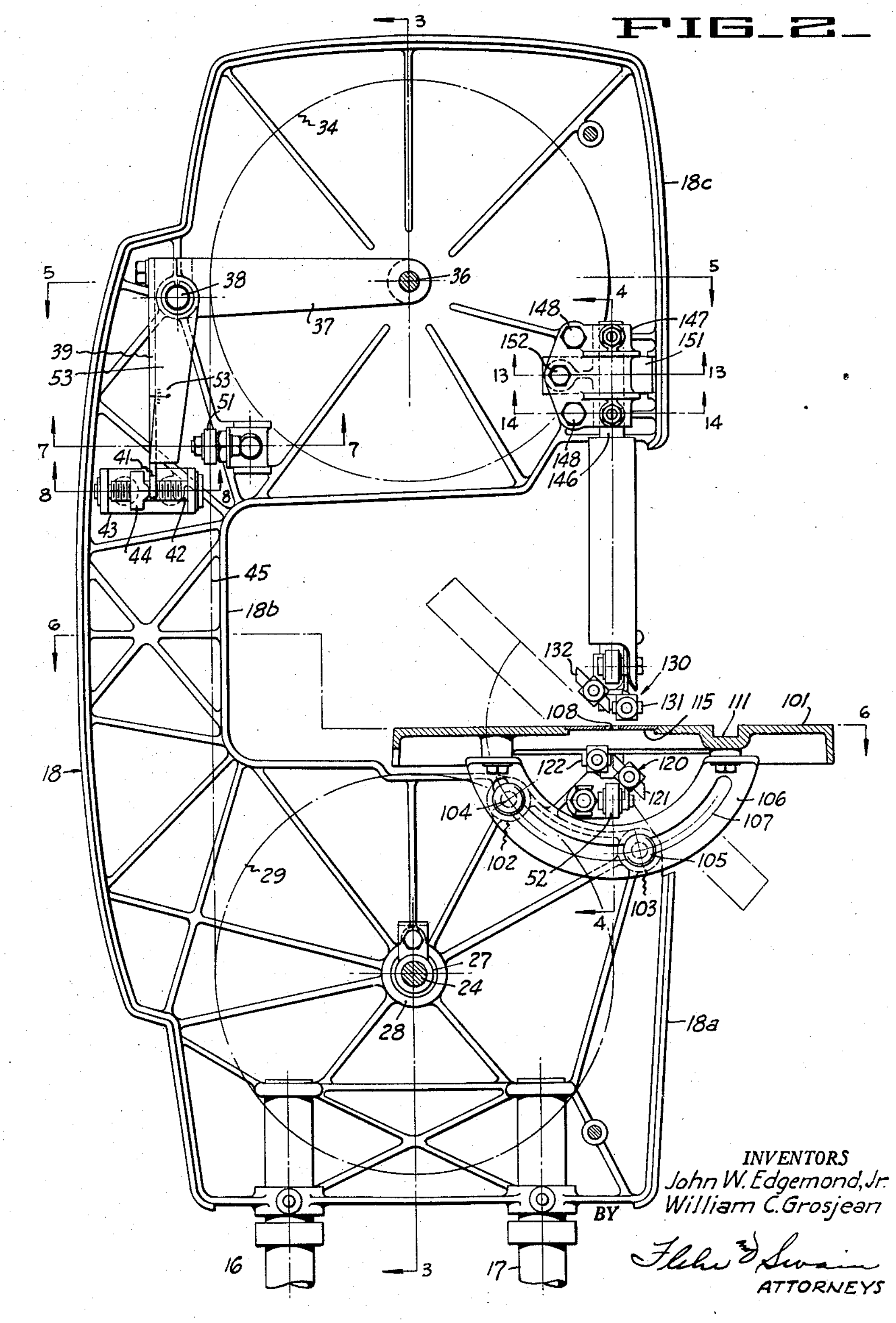
Figure 2 is a cross sectional view of the band saw illustrated in Figure 1, showing the two pulleys over which the saw blade is operated and showing the means for raising and lowering the upper pulley and for tilting the table.
Figures 7, 8:
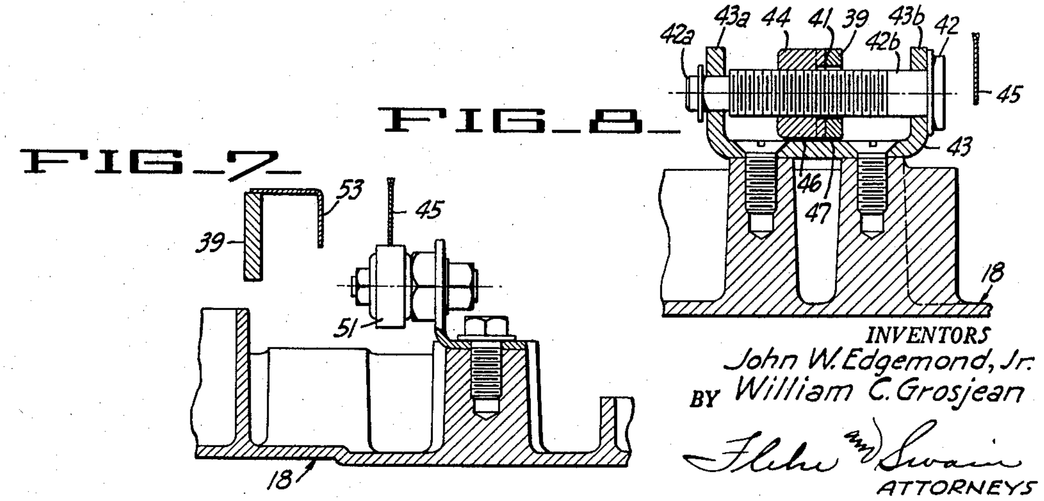
Figure 7 is a view taken along the line 7—7 of Figure 2 and shows the upper back-up roller and its mounting.
Figure 8 is a view taken through the line 8—8 of Figure 2 and illustrates the apparatus for raising and lowering the upper pulley and for adjusting the blade tension.

The driven shaft 24 is rotatably mounted in a bearing 27 which in turn is mounted in an appropriately positioned and machined boss 28 cast integrally with the base 18. The shaft 24 supports a driving pulley 29 whose rim 31 (Figure 3) is grooved at 32 to accommodate an annular tire 33 which may be formed of rubber, either natural or synthetic, or some other resilient material which will not dull the saw teeth and which will not be seriously cut by the saw teeth. The shaft 24 is coaxial with the driving shaft 23, and the plane of rotation of the pulley 29 is vertical. The upper pulley 34 is rotatably mounted upon an axle 36 which is supported upon a torsion arm 37 which is pivotally mounted upon a shaft 38. Torsion arm 37 is provided with a leaf spring 39 which extends downwardly, as indicated in Figure 2. The lower end of the spring 39 is formed, as shown in Figure 8, with a recessed portion 41 which is adapted to partially surround a bolt 42. The bolt 42 is provided with non-threaded portions 42*a* and 42*b* and is rotatably mounted in a U-shaped member 43 which is secured to bosses formed on the base 18. Intermediate the parallel arms or ends 43*a* and 43*b* of the U-shaped member 43 and threadedly mounted upon the bolt 42 is a nut 44 which is provided with a flat surface 46 which engages a similar surface 47 on the base of the U-shaped member 43. As the bolt 42 is turned, the member 44 will be urged in one direction or another, depending upon the direction of rotation of the member 42. The weight of the pulley 34, axle 36, torsion arm 37, and the resistance of the saw blade 45 will tend to urge the pulley 34 downwardly and the lower end of the spring 39 to the left, as viewed in Figure 2, against the member 44. When the member 44 is urged to the right, as viewed in Figure 2, the pulley 34 will be raised upwardly about the axis of the shaft 38. The pulley 34 is provided with a groove 48 and tire 49 which are substantially identical to the groove 32 and tire 33 on pulley 29.

A pair of rollers 51 (Figures 2 and 3) and 52 (Figures 2 and 4) are suitably mounted immediately adjacent the entering sides of the pulleys 29 and 34. It must be borne in mind that the pulleys 29 and 34 are rotating in a clockwise direction when viewed in Figure 2, and therefore the roller 51 is mounted in such a manner that the blade 45 engages it just before it engages the pulley 34. The roller 52 is mounted in such a manner that the blade 45 engages it just before it engages the pulley 29. Both the rollers 51 and 52 are permanently positioned with respect to the frame 18 to engage the back or non-toothed edge of the blade 45 to define the predetermined path of the blade 45 and to resist or overcome the tendency of the blade to move to the right, as viewed in Figure 3.

As has been previously pointed out, the drive shaft 24 is horizontal. The axis of the axle 36 is set an angle of one degree and fifteen minutes to the horizontal however, as shown in the schematic sketch, Figure 15. The pulleys 29 and 34 are conical in that a plane tangent to the periphery would be an angle of approximately two degrees to the axis of rotation, as likewise shown in Figure 15.

Figure 15:
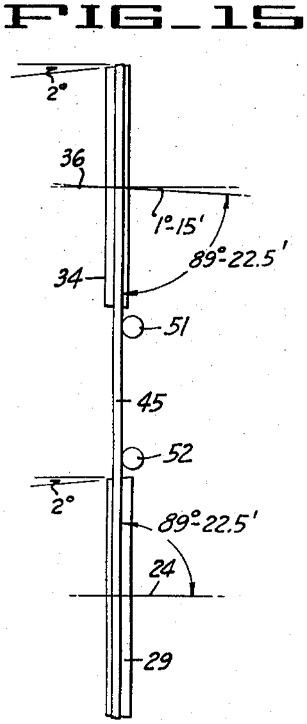
Figure 15 is a schematic view of our band saw showing the degree of tilt of the axis of the upper pulley and the conical shape of the pulleys.

Therefore, the angle of the blade 45 with respect to the axis of rotation of the pulley 29 is 90° less 37½ minutes. The angle of the blade with respect to the axis of the axle 36 is likewise 90° less 37½ minutes, all as illustrated in Figure 15. It will be apparent that the axes of the axle 36 and the shaft 24 could be offset 37½ minutes with respect to the horizontal, and the blade could be driven in a vertical plane, but since the drive shaft 24 must be horizontal, it is necessary, in effect, to tilt the whole device so that the blade does not operate in a vertical plane but operates in a plane which is 37½ minutes off the vertical.

A suitable scale 53 is secured to the torsion arm 37 and rotates about the shaft 38 generally as shown in Figure 2 in such a manner that one edge of the spring 39 is adapted to be aligned with a specific indicium upon the scale. The indicia on the scale 53 reflect different widths of saw blades 45 and show the recommended factory setting for the adjustable pulley 34 for blades of different widths. Blades of different widths operate at different tensions; the greater the width of the blade the greater the tension while the narrower the blade, the less the tension. Thus when a new blade is mounted on our device the whole assembly consisting of the pulley 34, arm 37 and scale 53 are rotated about the member 38 until all of the slack is taken out of the blade. Then by further movement of the member 44, the spring 39 is bent or put under tension until its edge lines up with the appropriate indicium on the scale 53. However when tension upon spring 39 is increased to increase the blade tension for a heavier or thicker blade, the pressure of the blade 45 against the back-up roller 51 is increased. To compensate for this increased pressure against the back-up roller 51, the torsion member 37 twists (due to increase blade tension) and thus automatically relocates the tilt axis of the shaft 36 and pulley 34. This reduces the conical effect of the pulley 34 and the lead-in effect which the tilted conical pulley 34 normally has on the blade 45 and, further, reduces the angle of the back edge of the blade 45 to the axis of pulley 34 thereby decreasing the pressure of the blade 45 on the back-up roller 51. When a lighter blade is used the pressure upon the spring 39 is decreased, the tension on the blade 45 will be lessened and the pressure on the back-up roller 51 will be decreased. The tension of a narrower or lighter blade will twist the member 37 to a lesser extent, will result in a lesser reduction of the conical effect of the pulley 34 and a lesser reduction of the lead-in effect of the blade 45, and will increase the angle of the back edge of the blade 45 to the axis of pulley 34.

While we have shown a torsion arm 37 we contemplate that the same result would occur if the pulley 34 was supported by a rigid member having a torsion mounting.

Operation of our tensioning means and our automatic tilting and tracking mechanism may briefly be described as follows:

The operation of the guide shoes (both horizontally and vertically), the table insert and the slotted table will be described further on in this specification.

Let it be assumed that the device is in the condition illustrated in the drawings. A blade 45 of selected width is positioned about the pulleys 29 and 34. The width of the blade is noted and the arm 39 is positioned with respect to the scale 53 so that it is aligned with the indicium which corresponds to the width of the blade. The back-up rollers 51 and 52 are inspected to determine that they define a plane or path of operation of the blade 45 which has been designed to be at an angle of 37½ minutes off the vertical.

The cover may be replaced so that the pulleys 29 and 34 and the greater length of the blade 45 is shrouded.

The shaft 24 is connected through a coupling 26 to the driving shaft 23. The motor may be started.

Figures 3, 4:
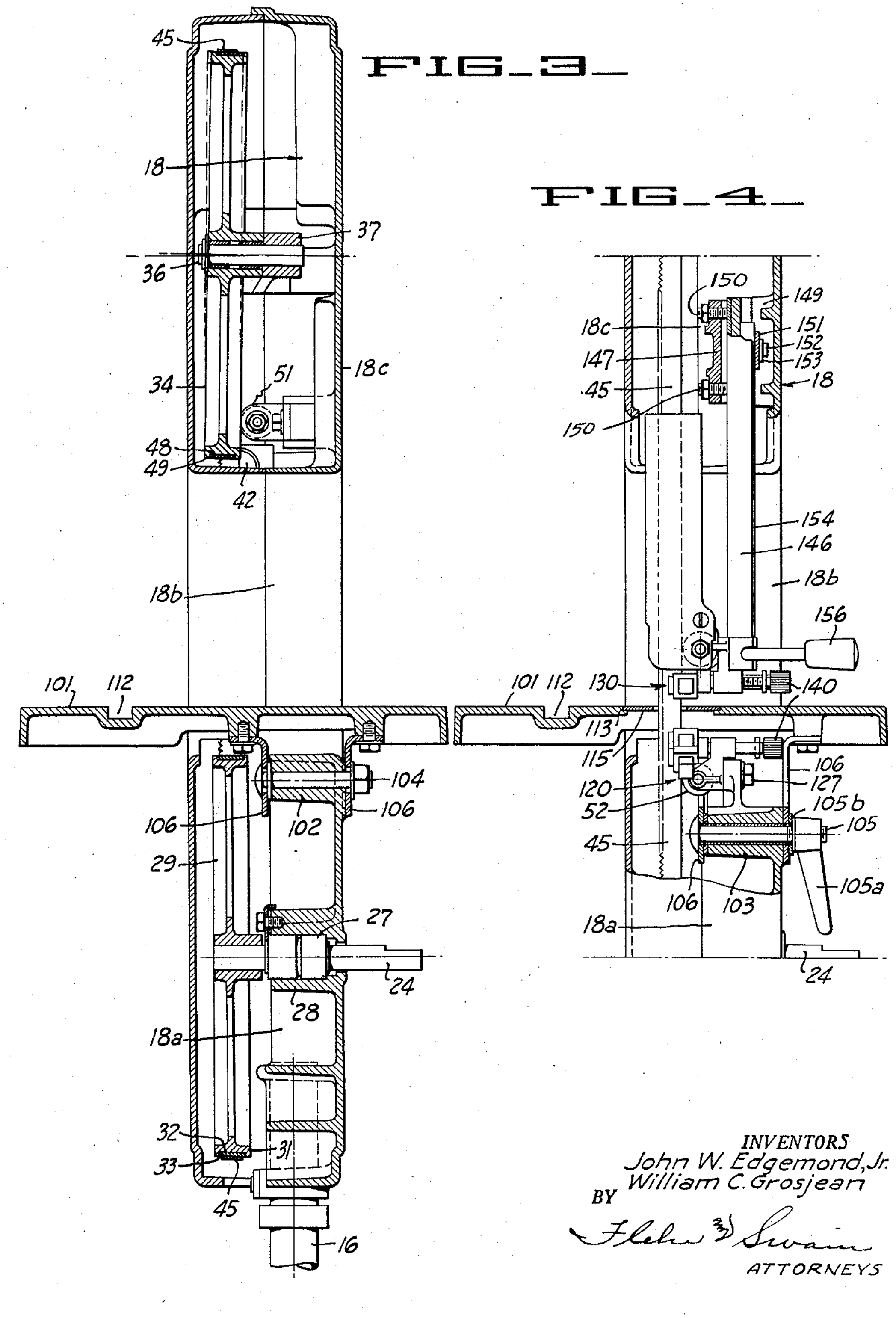
Figure 3 is a view taken through the line 3—3 of Figure 2 showing the mounting of the lower pulley and the table and the tilting of the upper pulley.
Figure 4 is a view taken along the line 4—4 of Figure 2 and shows a part of the table mounting mechanism and the guide shoe mechanism.

The blade 45 will be driven past the work station and because of the tilt of the pulley 34 and the generally conical shape of the pulleys 29 and 34, the blade 45 will seek the crown or greatest diameter of the pulleys 29 and 34 and will be urged to the right as viewed in Figures 3 and 15 into engagement with the back-up rollers 51 and and 52. These rollers are positioned at points where they engage the blade immediately before it engages the associated pulley. Thus, the back-up rollers define the path of the blade. The mounting of the pulleys and their conical shape keeps the blade in that path.

As has been previously mentioned, when a wider blade is used, greater tension is required and the tension of the blade is adjusted by increasing the tension of spring 39. The greater tension of a wider blade would increase the blade pressure against the back-up roller 51 and to prevent excessive pressure and resultant excessive wear we have mounted the pulley 34 upon a torsion member 37. Thus the increased tension of a wider blade twists the member 37 about its longitudinal axis and changes the tilt of the axle 36 and of the plane of the pulley 34. This results in a lessening of the lead-in effect which the conical pulley 34 normally has on the blade 45 and decreases the pressure of the blade upon the back-up roller 51.

Figure 16:
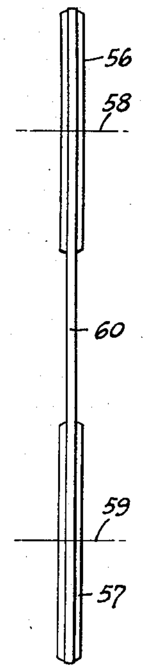
Figure 16 is a schematic view of a conventional band saw utilizing crowned pulleys.

When a blade is operated over a pair of crowned pulleys 56 and 57 rotating in the same plane and about parallel axes 58 and 59, the saw blade will seek the crowns, will tend to follow the path indicated at 60 (see Figure 16), and will seek a path in the plane of the greatest circumferences of the pulleys 56 and 57.

Figure 17:
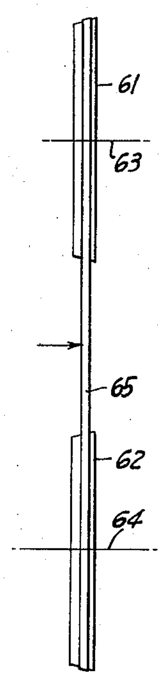
Figure 17 is a schematic view of another type of band saw showing the utilization of tapered or conical pulleys on parallel axes.

We have found that when conically shaped pulleys of the type illustrated in Figure 17 at 61 and 62 are rotated about the axes of parallel shafts 63 and 64, the blade 65 will seek the plane of the greatest circumference of each of said pulleys 61 and 62 and will, unless prevented by annular flanges on the pulleys 61 and 62 or by rollers of the type 51 and 52 on our device, continue to move to the right, as viewed in Figure 17, and will ultimately become entirely disengaged from the pulleys 61 and 62.

Figure 18:
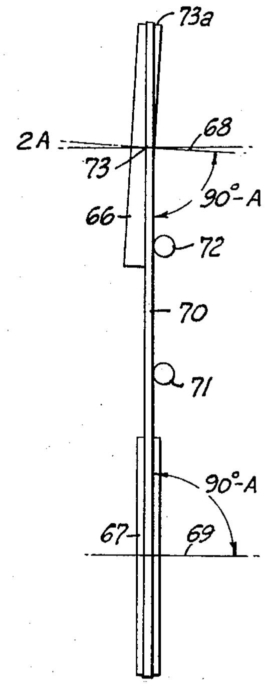
Figure 18 illustrates a modified type of band saw showing square pulleys mounted on non-parallel axes.

We have also found that when pulleys 66 and 67, as shown in Figure 18, are mounted for rotation about offset axes 68 and 69, the same phenomenon will occur. Let it be assumed that the axes 68 and 69 are offset one degree and fifteen minutes, as has previously been described in connection with our preferred embodiment. Let it also be assumed that the rims of the pulleys 66 and 67 are not crowned or tapered. We have found that the blade 70 travels in a plane at an angle with respect to each axis and that rollers 71 and 72 are required. It would ordinarily be assumed that the blade 70 would travel upwardly or to the left, as viewed in Figure 18, but it must be borne in mind that the blade 70 engages pulley 66 at a point 73 and the tracking or frictional engagement of the blade with the pulley 66 keeps the blade from climbing to the left, and, in fact, urges it to the right, necessitating the utilization of rollers 71 and 72. In other words, the point 73 at which the blade 70 engages the pulleys 66, will, as the pulley 66 rotates, approach the point **73*a*** and, in this manner, the saw blade will be continually urged to the right, as viewed in Figure 18.

Figure 19:
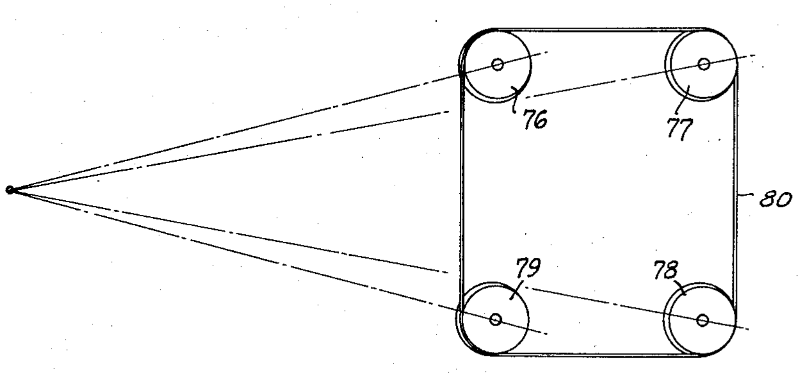
Figure 19 is a schematic view of tapered pulleys on a four pulley machine on non-parallel axes.

We have also noted a phenomenon, as illustrated in Figure 19, in which a plurality (more than two) of tapered pulleys (of the type shown in Figures 16 and 18), 76, 77, 78 and 79 rotate about offset axes. The blade 80 will tend to operate in the plane defined by the greatest effective circumference of the combined pulleys 76, 77, 78 and 79, previously described, and back-up rollers would be required to engage the non-toothed or smooth surface of the blade 80 to maintain the same upon the pulleys 76 to 79 inclusive.

The table which is adapted to support the work piece consists generally of a flat member 101 which is tiltably supported as viewed in Figure 2. The base 18 is provided with a pair of bosses 102 and 103 (Figures 3 and 4) each of which accommodates a bolt 104 and 105. A pair of identical arcuately shaped members 106 are secured to the bottom side of the table 101. The members 106 are provided with arcuate slots 107 (Figure 2) through which the bolts 104 and 105 pass, as viewed in Figures 3 and 4, and the bolts 104 and 105 define the path of the arcuate slots 107. The arcuate members 106 and their arcuate slots 107 are so designed that their centers coincide at 108 (which defines a line across the middle of the table 101) so that the table 101 pivots about the line 108. The line 108 also determines the center line through which the blade 45 passes so that the table 101 may also be said to pivot about the center line of the blade 45.

Figure 6:
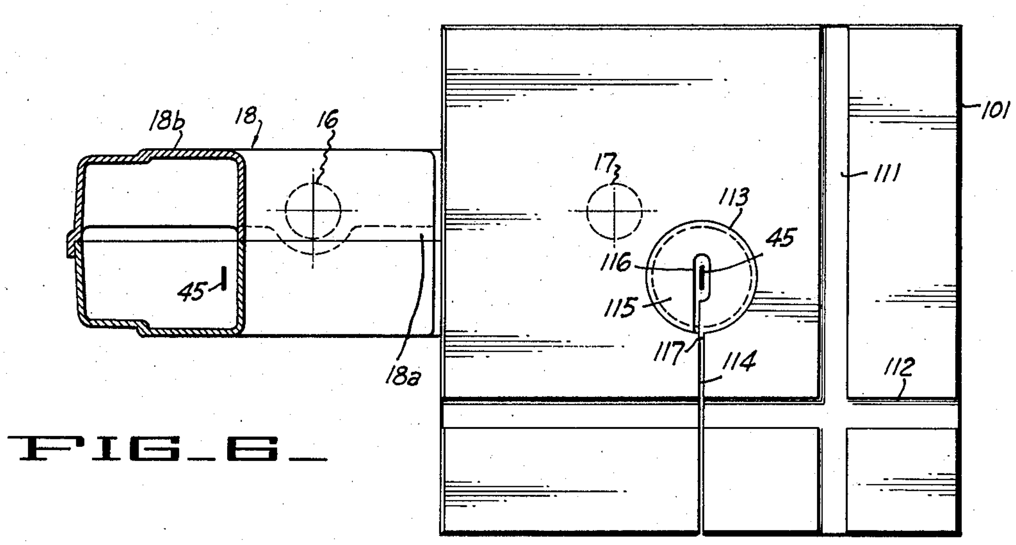
Figure 6 is a view taken along the line 6—6 of Figure 2 and shows the table construction which incorporates our insert and the two slots which are set at right angle to each other to accommodate a mitre gauge whereby it may be used as a mitre gauge or a fence.
Figure 5:
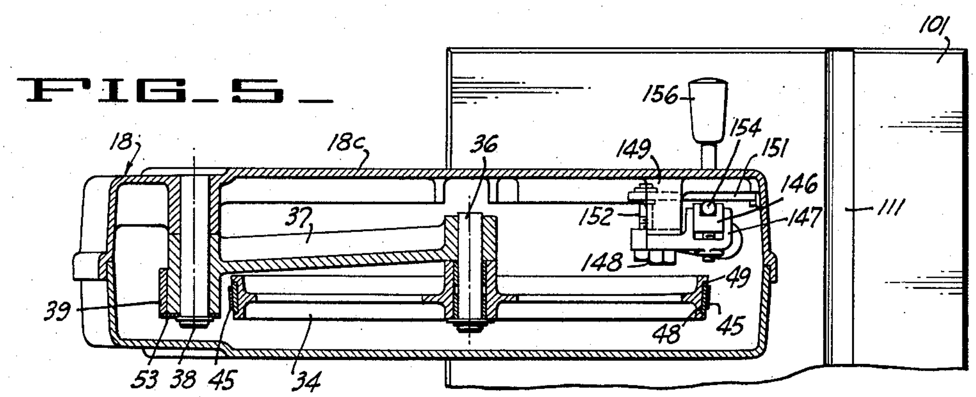
Figure 5 is a view taken along the line 5—5 of Figure 2 and shows the torsion arm mounting of the upper pulley and the single control mechanism which permits one hand operation of the upper guide.
Figure 21:
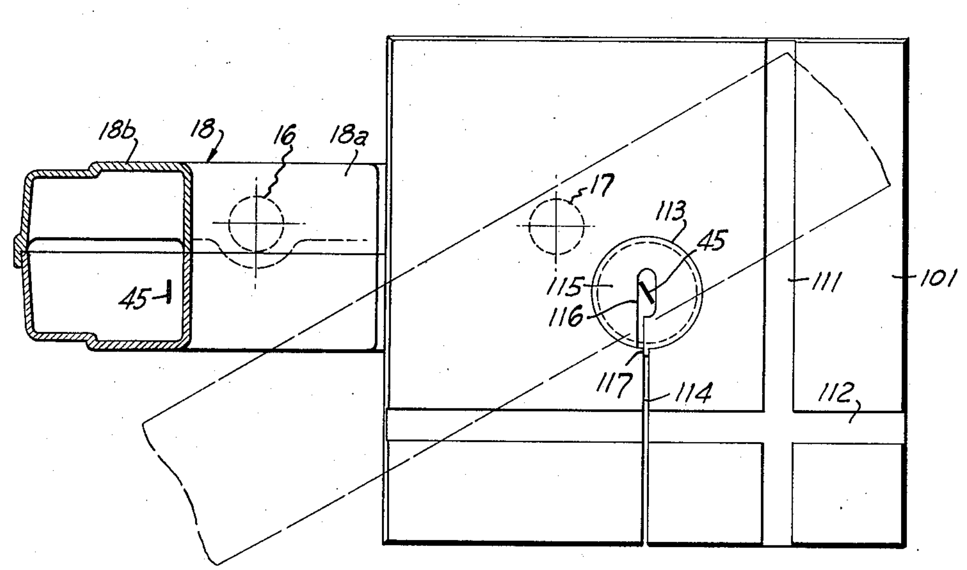
Figure 21 (sheet 8) is a view, similar to Figure 6, showing a modification which illustrates the path of travel of a band saw blade when the guide shoes have been reversed.

The table 101 is also provided with a pair of slots 111 and 112 which are set at right angles to each other (Figures 6 and 21).

Figures 9, 10, 11:
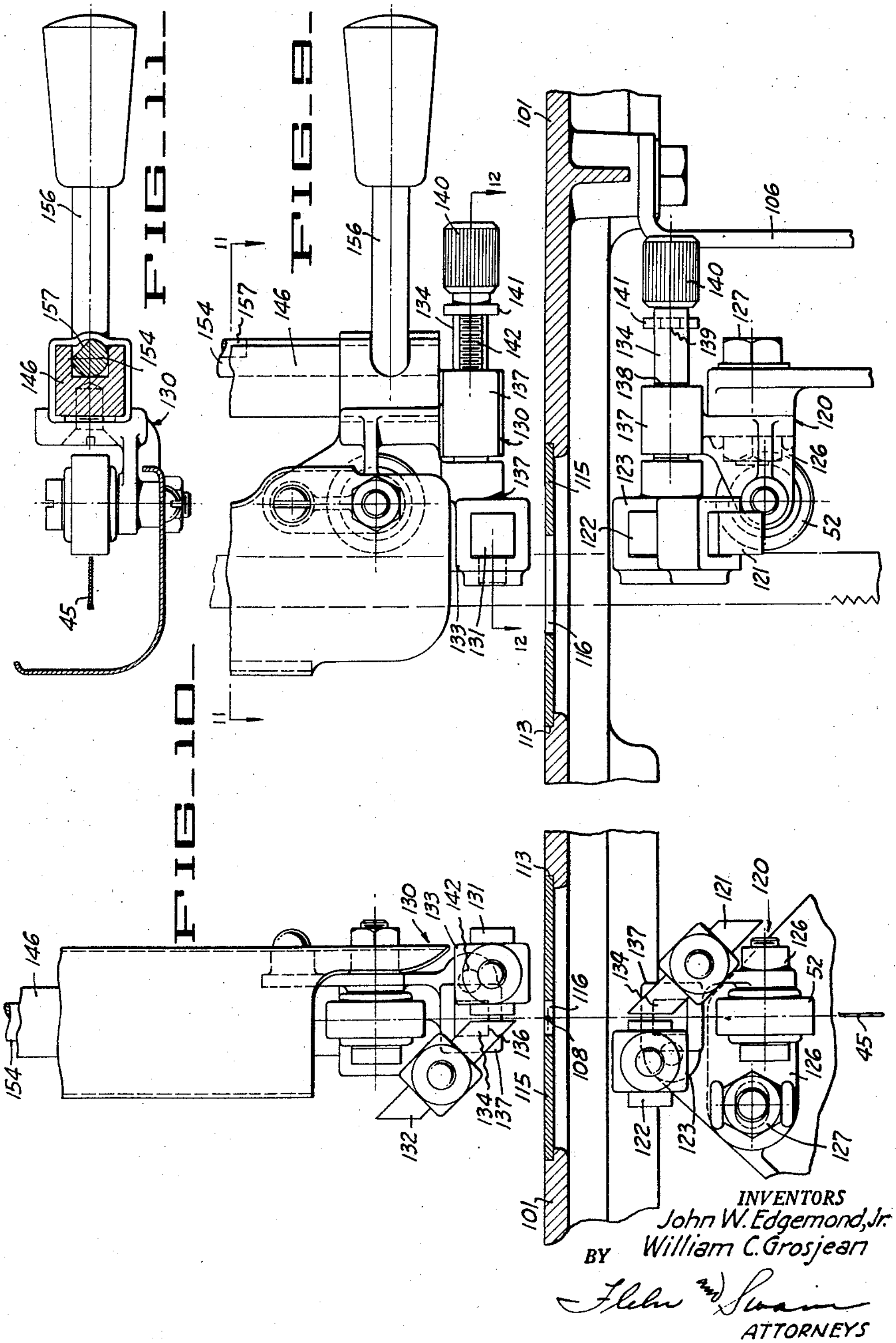
Figure 9 is an enlarged detail view of the guide shoe mechanism in fully retracted position, the means for adjusting the same and the lower back-up roller.
Figure 10 is a side view of the mechanism illustrated in Figure 9.
Figure 11 is a detail taken along the line 11—11 of Figure 9 showing the single lever control operating mechanism for raising and lowering the upper guide shoes and for locking the same in a predetermined selected position. The third guide roller which is immediately above the work and which is normally not engaged by the blade, except when a work piece is being cut, is also shown in this figure.

The slots 111 and 112 correspond to the slot 305 shown in Figure 10 of the aforementioned Edgemond application Serial No. 494,468, filed March 15, 1955. The channels or slots 111 and 112 are adapted to receive the bar of a mitre gauge assembly of the type described in said Goldschmidt and Edgemond application. The bar of the mitre gauge assembly described in said application is provided with a longitudinal slot and a tapered hole arranged to receive a tapered set screw whereby the bar may be wedged in the slot, thus locking the mitre gauge assembly in a predetermined position.

The table 101 is also provided with a circular hole 113 through which the blade 45 passes. A slot 114 is also provided between one side edge of the table 101 and the hole 113 so that the continuous blade 45 may be properly positioned with respect to the table 101. The hole 113 is provided with an insert 115 which is generally circular, as is the hole 113, and which is adapted to lie flush with the top of the table 101. The insert 115 is also slotted at 116 to accommodate the blade 45 and it is provided with an offset 117 which is adapted to be received in the slot 114. With the offset 117 positioned in the slot 114 as shown, it is obvious that undesired rotation of the insert 115 which might be caused by vibration of the entire device is eliminated.

Operation of the slotted table and the insert may briefly be described as follows. Let it be assumed that a new blade is to be positioned upon our device. It is suitably threaded over the pulleys 29 and 34 and passed through the slot 114 in the table 101 until it is ultimately positioned in the hole 113. The insert 115 may then be positioned as shown, in such a manner that the offset 117 engages the slot 114 whereupon it will be found that the blade 45 operates within the slot 116. Movement of the insert 115 is prevented by the engagement of the offset 117 in the slot 114.

A mitre gauge of the type previously described in the above identified Goldschmidt and Edgemond application may be used in either of the slots 111 or 112 and may be locked in slot 112 to act as a fence. This permits the utilization of our band saw for not only the type of use customarily associated with band saws, but for the purpose of making straight cuts as well.

Substantially continuous tension is maintained upon the members 106 by the nut and bolt assembly 104, but a locking action is obtained through the handle **105*a* on the bolt 105. When the handle 105*a* is tightened, the head of the bolt 105 and the washer 105*b* frictionally engage the members 106 and urge the same into greater frictional engagement with the boss 103 on the frame 18, thereby preventing the movement of the members 106. When the handle 105*a* is released, the members 106 may be swung about the center line 108 with the result that the table 101 may also be tilted about the axis defined by the center line 108**.

We have also provided suitable guides for the blade 45 immediately adjacent the work piece and have provided a single control which permits one hand operation of the guides.

Generally speaking, the lower guide assembly 120 (Figures 9 and 10) lies immediately below the table 101 and consists of a pair of shoes 121 and 122 which are mounted in a head 123 so that they may be moved toward or away from each other. Suitable means may be provided to lock them in a predetermined position in the head 123. The head 123 forms a single assembly and is adapted to be moved laterally with respect to the support 126 which is secured to the base 18 by means of a bolt 127 which engages a portion of the boss 103. The upper guide 130 consists of a pair of shoes 131 and 132 which are slidably movable toward and away from each other, and which are retained in a suitable mounting 133, as viewed in Figure 12. The member 133 is substantially identical to the member 123 and is mounted upon a square shaft 134 which is movable in a square passage 136 in a fixed housing 137. The passage 136 is slightly larger than the member 134 and a leaf spring member 138 is positioned in the slot 136 and tends to urge the member 134 into a predetermined position along one side of the slot 136. The square shaft 134 is provided with an arcuate slot 139 which is engaged by a collar 141 upon a threaded member 142. The threaded member 142 is permanently mounted in the member 137, and thus when the member 140 is rotated, the collar 141 will be moved toward or away from the member 137. As the collar is advanced toward or moved away from the member 137, the slot 139 which it engages will likewise be moved toward or away from the member 137 with the result that the lateral position of the member 133 and shoes 131 and 132 will likewise be defined.

The lower shoes 121 and 122 are adapted to be moved only laterally with respect to the frame 18 and the mechanism for permitting this movement is identical to that which permits lateral adjustment of the shoes 131 and 132. As they are shown in Figures 4, 9 and 12, the guide shoes 121 and 122, and 131 and 132 are in retracted position and are adapted to be moved to operative position in the manner described.

However, the shoes 131 and 132 (in addition to being moved laterally, as has previously been described) are adapted to be moved vertically. As shown in Figures 4 and 9, the member 137 is mounted on the lower end of a longitudinally slotted member 146. The member 146 is mounted for vertical movement with respect to the frame 18. As illustrated in Figure 4, it is slidably mounted in a member 147 which is secured to the frame 18 by means of bolts 148 which engage suitable bosses 149 formed integrally with the member 18. The member 147 forms two sides of the guide for the member 146, the adjustable screws 150 form the third side and a leaf spring member 151 forms the other side. Tension upon the leaf spring member 151 is adjustable. One end of the spring is supported against the casting 18, and the other end is engaged by the bolt 152 (Figure 14) which threadedly engages the member 147. Upon rotation of the bolt 152, the spring 151 will be urged into closer engagement with the member 146.

Figure 13:
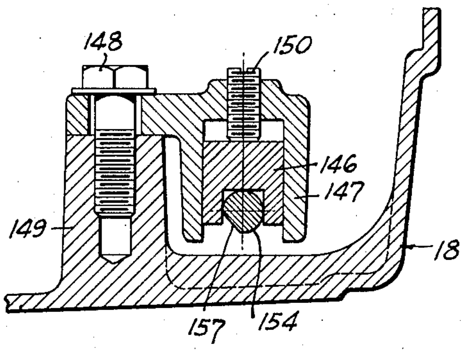
Figure 13 is a view taken along the line 13—13 of Figure 2 and shows the guide within which the upper guide shoe supporting mechanism is mounted.
Figure 14:
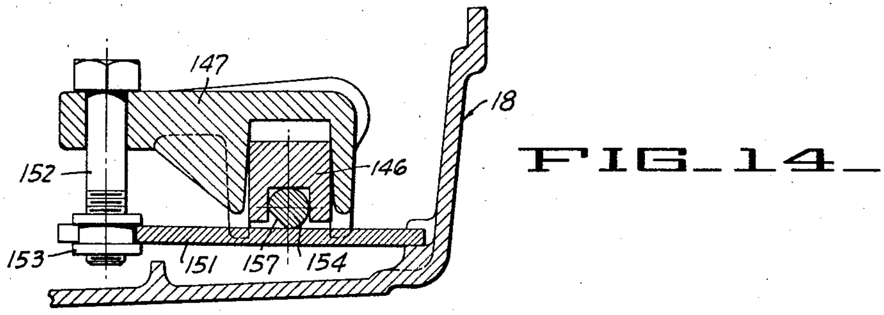
Figure 14 is a view taken along the line 14—14 of Figure 2 and shows the adjustable spring clamping mechanism for the one hand single control upper guide shoe operating mechanism.
Figure 20:
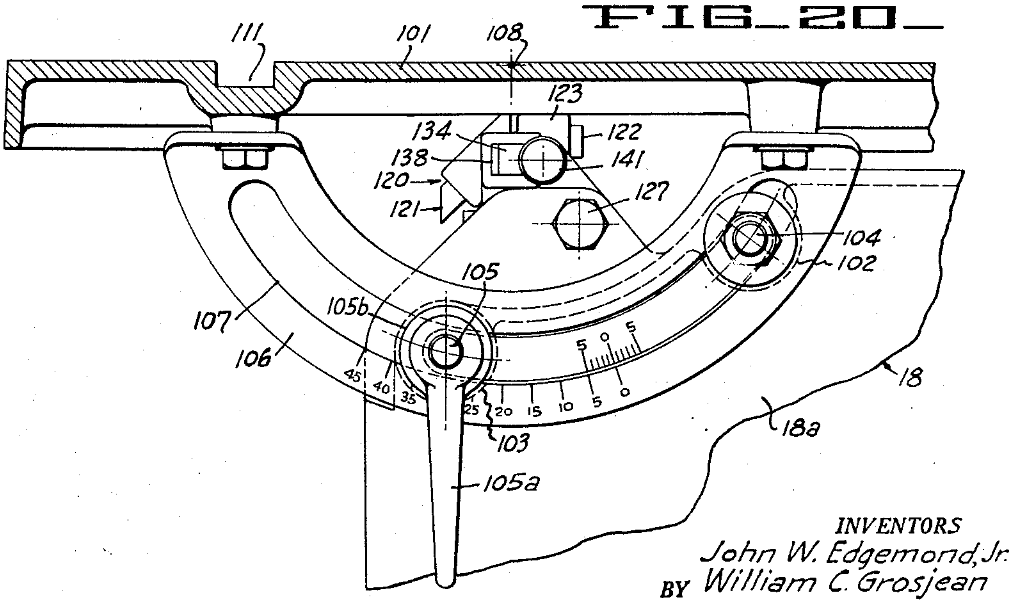
Figure 20 (sheet 6) is an enlarged view of the table tilting and locking mechanism.

The slot of the U-shaped member supports a vertical shaft 154 which is provided with a handle portion 156 and one side of the shaft 154 is flattened as at 157 (Figures 13 and 14). When the flattened surface 157 is positioned toward the spring 151, the entire assembly is adapted to be raised and lowered within the member 147 and with respect to the frame 18. However, when the member 154 is rotated in such a manner that some portion thereof other than the flattened portion 157 lies adjacent the spring 151, the same will have a locking effect with respect to the member 151 with the result that the member 146 may not be reciprocated in the member 147 with respect to the base portion 18. Thus, an operator may release the guide shoes 131 and 132 and the auxiliary roller 158 from one position by turning the handle 156 about the axis of the shaft 154. He may then raise or lower this assembly by sliding it upwardly or downwardly by using the same handle and may then lock it in a new position by turning the handle back so that the shaft 154 engages the spring 151.

Figure 22:
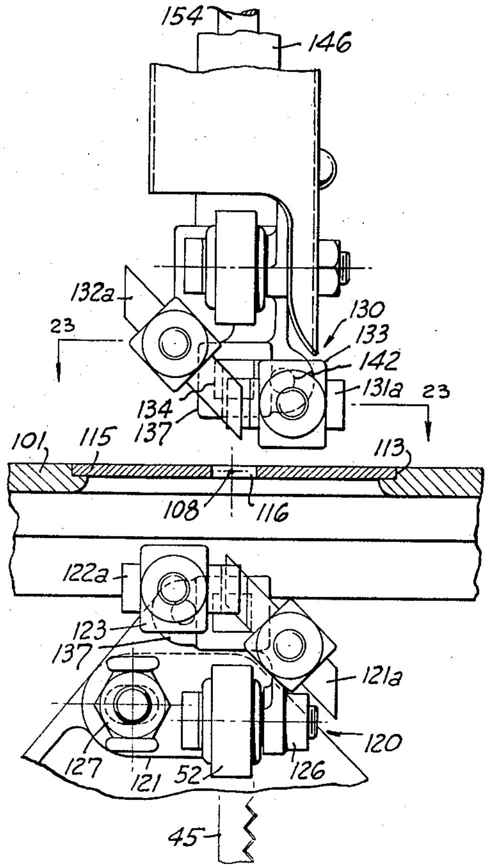
Figure 22 is a view, similar to Figure 10, illustrating the manner in which the guide shoes may be reversed to twist the blade about its longitudinal axis as it passes the worktable.
Figure 23:
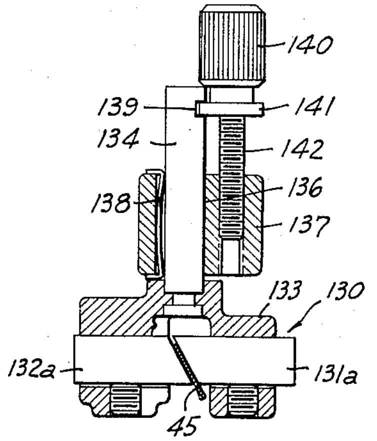
Figure 23 is a view similar to Figure 12 showing the manner of forming the guide shoes to twist the blade.

In the modifications illustrated in Figures 21, 22 and 23 we have provided a means of twisting the band saw blade 45 about its longitudinal axis as it passes the worktable and workpiece. As illustrated particularly in Figure 6, when a band saw blade is operated in its normal path, the length of the workpiece is limited by the distance between the blade 45 as it passes through the worktable 101 and the frame **18*b***. If this distance is 14 inches, for example, then one dimension of the workpiece is limited to 14 inches.

We have found that by twisting the blade 45 in the manner illustrated in Figure 21, for example, that a workpiece, illustrated in dotted lines, may be of considerably greater length and yet be cut by our band saw.

In order to twist the blade 45, we have designed the shoes 131 and 132 so that they and the shoes 121 and 122 are reversible. As illustrated in Figures 9, 10 and 12, the adjacent ends of the shoes 121 and 122 and 131 and 132 are parallel and define a path for the blade 45 which is parallel to the slot 111 and at right angles to the slot 112 in the table 101. However when the shoes are reversed as indicated at **121*a* and 122*a* on the lower assembly and at 131*a* and 132*a* in the upper assembly, the reversed ends cooperate to form parallel slots the side walls of which engage the blade 45 and twist the blade about its longitudinal axis. As indicated in Figures 21, 22 and 23, the blade is twisted to an angle of about 30° with respect to the slot 111**.

When the shoes 121 and 122, and 131 and 132, are reversed as previously described and the blade 45 is tilted in the manner illustrated, it is apparent that a workpiece may be positioned on the table 101 in such a manner that it may be sawed without engaging the throat section **18*b* of the frame 18**. The utilization of this assembly increases the effective length of the workpiece with which our saw may be utilized.

We claim:

1. In a band saw construction of the type having a blade which is driven over a pluralilty of pulleys, means defining a predetermined path comprising a plurality of back up rollers adapted to engage said blade at points in said path immediately ahead of the points at which said blade engages the next pulley in its path, means for urging the blade into said path, said last named means comprising a torsion arm mounting for one of said pulleys permitting the tilting of the axis of rotation of said one of said pulleys with respect to the axis of rotation of the other of said pulleys.

2. In a band saw construction of the type adapted to operate with blades of various widths which operate at a different tension and being of the type in which a predetermined path of operation of said blade is defined by back up rollers, means for causing a blade to run in the path defined by said back up rollers, and means for automatically compensating for the varying pressure against said back up rollers caused by blades of varying widths, said means comprising a torsion mounting for one of said pulleys whereby the axis of rotation of said pulley will vary with the tension of the blade and vary the pressure of said blade against said back up rollers.

3. In a band saw construction adapted to receive blades of varying widths which operate at a different tension, said saw further being of the type in which the path of operation of the blade is defined by a plurality of back up rollers and which is so constructed that a blade is caused to operate in the path defined by said back up rollers, means for automatically compensating for different pressures against said back up rollers caused by blades of different widths, said means comprising a mounting for one of said pulleys whereby the axis of rotation of said pulley will tilt in response to the tension of the blade to vary the pressure of said blade against said back up rollers, said mounting comprising a torsion arm one end of which is pivotally secured to the frame of the saw and the other end of which supports said pulley.

References Cited in the file of this patent

UNITED STATES PATENTS

| | | |
|---|---|---|
| 114,710 | Richards | May 9, 1871 |
| 271,408 | Brennan | Jan. 30, 1883 |
| 380,828 | Striegel | Apr. 10, 1888 |
| 380,857 | Bryant | Apr. 10, 1888 |
| 389,723 | Trumbull | Sept. 18, 1888 |
| 779,158 | Harrold et al. | Jan. 3, 1905 |
| 790,182 | Butterworth | May 16, 1905 |
| 801,815 | Seymour | Oct. 10, 1905 |
| 984,237 | Osburn | Feb. 14, 1911 |
| 1,069,748 | Wertenbaker | Aug. 12, 1913 |
| 1,074,197 | Pelton | Sept. 30, 1913 |
| 1,322,743 | Wright | Nov. 25, 1919 |
| 1,323,818 | Berry | Dec. 2, 1919 |
| 1,453,335 | Bennett | May 1, 1923 |
| 1,580,407 | Carlson | Apr. 13, 1926 |
| 1,879,145 | Erickson | Sept. 27, 1932 |
| 1,967,724 | Ponton | July 24, 1934 |
| 2,020,222 | Tautz | Nov. 5, 1935 |
| 2,059,595 | McKeage | Nov. 3, 1936 |
| 2,081,033 | Biro | May 18, 1937 |
| 2,311,426 | Wilkie | Feb. 16, 1943 |
| 2,311,762 | Kottman et al. | Feb. 23, 1943 |
| 2,670,767 | Miller | Mar. 2, 1954 |
| 2,705,510 | Stocke | Apr. 5, 1955 |
| 2,782,811 | Johnson | Feb. 26, 1957 |